(12) United States Patent  (10) Patent No.: US 6,536,371 B2
Brazell  (45) Date of Patent: Mar. 25, 2003

(54) ROTARY DIRECTION INDICATOR

(75) Inventor: Kenneth M. Brazell, Piedmont, SC (US)

(73) Assignee: One World Technologies, Inc., Anderson, SC (US)

( * ) Notice: Subject to any disclaimer, the term of this patent is extended or adjusted under 35 U.S.C. 154(b) by 0 days.

(21) Appl. No.: 09/920,256

(22) Filed: Aug. 1, 2001

(65) Prior Publication Data

US 2003/0024466 A1 Feb. 6, 2003

(51) Int. Cl.[7] .................................................. G09F 11/04
(52) U.S. Cl. ........................ 116/309; 116/284; 116/298; 116/318
(58) Field of Search .................................. 116/317, 318, 116/309, 307, 316, 284, 298, 300

(56) References Cited

U.S. PATENT DOCUMENTS

| 2,485,942 | A | * | 10/1949 | Turner | 116/277 |
|---|---|---|---|---|---|
| 2,614,520 | A | * | 10/1952 | Allen | 116/277 |
| 4,446,811 | A | * | 5/1984 | Howie, Jr. | 116/309 |
| 4,655,160 | A | * | 4/1987 | Ligh | 116/277 |
| 5,040,444 | A | | 8/1991 | Shiotani et al. | |
| 5,116,249 | A | | 5/1992 | Shiotani et al. | |
| D398,511 | S | | 9/1998 | Fortin et al. | |
| 5,983,826 | A | * | 11/1999 | Lohde | 116/277 |

* cited by examiner

Primary Examiner—Diego Gutierrez
Assistant Examiner—Travis Reis
(74) Attorney, Agent, or Firm—Brooks & Kushman P.C.

(57) ABSTRACT

A rotary direction indicator provided for use with a rotating element which causes the rotation of an associated member. The rotary direction indicator has an internally compliant body fixed in a normal to a central axis which has formed thereon a pair of arrows which appear to be three-dimensional moving in a clockwise direction. One of the three-dimensional arrows appears to plunge into the surface of the body while the other of three-dimensional arrows appear to rise out of the surface of the body thereby providing a visual indication of a correspondence between the direction of rotation of the rotary element and the movement of the associated member.

21 Claims, 2 Drawing Sheets

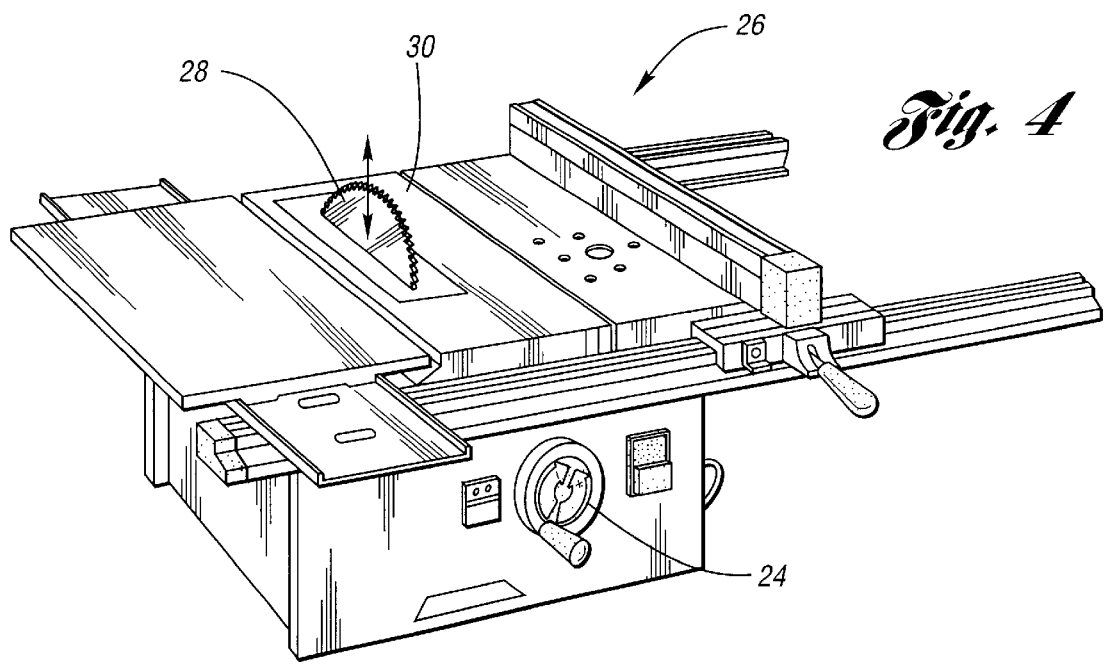
Fig. 4
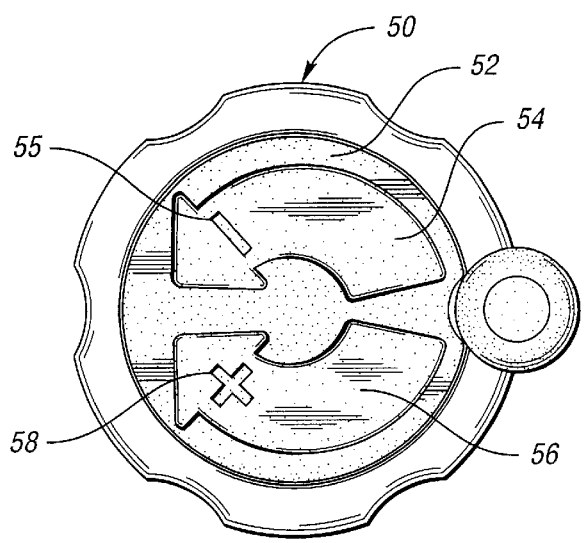
Fig. 5
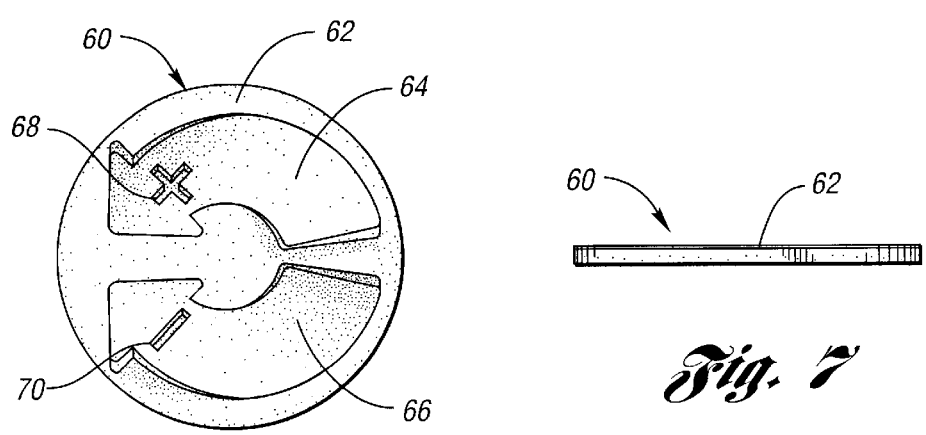
Fig. 6
Fig. 7

ROTARY DIRECTION INDICATOR

TECHNICAL FIELD

The present invention relates to rotary direction indicators for handles, knobs or the like, particularly rotary hand wheels used on power tools.

BACKGROUND ART

Rotary wheels and knobs are frequently provided with indicia indicating which direction to rotate the knob to achieve the desired result. For example, a rotary knob on a propane tank may have a raised counterclockwise arrow and the associate word "open" on one side of the knob and a clockwise arrow and the word "close" on a diagonally opposite side of the knob in order to provide a visual indication as to which direction the knob should be rotated to achieve the desired result. Likewise, medicine bottles may have written indicia on the top of the bottle cap indicating "push and rotate to open" with a corresponding direction arrow indicating the appropriate direction of rotation.

Many times in power tool applications, a rotary actuator such as a hand wheel or a hand crank will be provided enabling the power tool operator to rotate the rotary element and in turn, cause an associated member to move linearly. An example is a shaper table where an operator may rotate a hand wheel to cause the cutter to move axially upward or downward relative to the shaper table surface. Another example is a table saw where the operator will rotate a hand wheel or other rotary actuators mounted on the front surface of the table saw cabinet and in turn, cause the saw blade to raise or lower relative to the table saw table top surface. In many instances, it is not obvious which way to turn the hand wheel to achieve the desired linear motion of the associated member. Furthermore, from product to product, or manufacturer to manufacturer which way one must turn the hand wheel may vary adding to the uncertainty.

Accordingly, it is an object of the present invention to provide a simple and intuitive rotary direction indicator enabling an operator to visually perceive what direction the associated member will move linearly in response to a rotation of a rotatable element. It is further an object of the present invention to provide a simple rotary direction indicator which does not require language text and can be universally understood with minimal or no instruction.

DISCLOSURE OF INVENTION

Accordingly, the rotary direction indicator is provided for use with a rotary element which is visible by a user and which can be rotated to cause an associated member to move linearly. The rotary direction indicator has a generally flat surface extending normal to a central axis of rotation. The indicator body has formed therein a pair of indicating arrows; one corresponding to a clockwise rotation and the other corresponding to a counterclockwise rotation of the indicator about the central axis. The indicating arrows are spaced from and curve about the central axis and have pointed arrow heads which indicate the direction of rotation. One of the arrows is perceived to rise out of the surface of the body while the other arrow is perceived to plunge into the surface of the body providing the user with a visual indication of a correspondence between the rotation of the direction indicator and the linear movement of the associated member. In the preferred embodiment, the direction indicator is associated with a rotary actuator and the arrows are three-dimensional and physically rise out of or plunge into the surface of the rotary direction indicator body.

BRIEF DESCRIPTION OF DRAWINGS

FIG. 4 is an illustration of the table saw employing a rotary direction indicator of the present invention;

FIG. 5 is an axial end view of a rotary actuator having an alternative second embodiment of the rotary direction indicator;

FIG. 6 is an alternative third embodiment of the rotary direction indicator; and FIG. 7 is a side elevational view of the rotary direction indicator of FIG. 6.

BEST MODE FOR CARRYING OUT THE INVENTION

Figure 1:
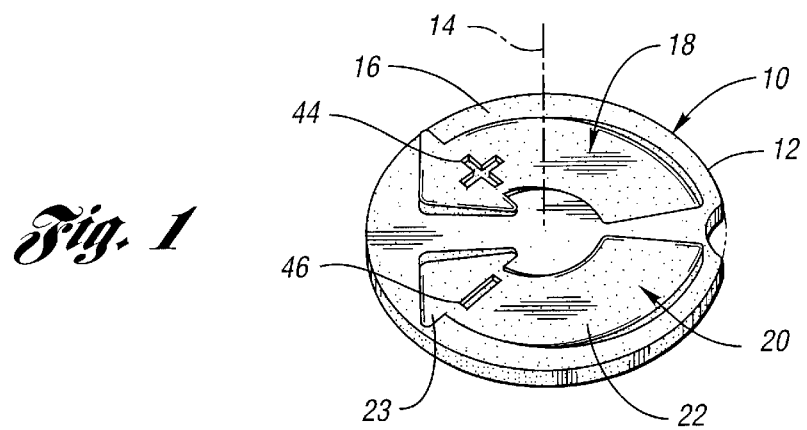
FIG. 1 is a perspective view of a rotary direction indicator of the present invention.

A first embodiment of rotary direction indicator 10 is illustrated in FIGS. 1–4. The rotary direction indicator 10 is formed by a body 12 which is in the shape of a generally circular disk oriented generally normal to the central axis of rotation 14. Body 12 has a generally flat upper surface 16 normal to central axis 14. Body 12 has formed thereon two three-dimensional indicating arrows 18 and 20. Arrow 18 points in a counterclockwise direction while arrow 20 points in the opposite clockwise orientation. Each of the three-dimensional indicating arrows 18 and 20 are spaced outboard of the central axis and curved thereabout. Preferably, each of the indicating arrows 18 and 20 will be provided with a shaft portion 22 and an enlarged arrowhead portion 23. In the first embodiment of the invention illustrated, counterclockwise arrow 20 plunges into the surface 16 of body 12 moving along the arrow 20 in a clockwise direction. Counterclockwise arrow 18 rises out of the surface 16 of body 12 moving along the arrow in the counterclockwise direction. Arrows 18 and 20 provide a simple visual indication to the user what direction the associated member will move in response to rotation of the rotary element associated with the rotary direction indicator.

For example, when the rotary direction indicator is affixed to a rotary actuator 24, used in conjunction with a table saw 26 illustrated in FIG. 4, rotation of the rotary actuator 24 in a clockwise direction will cause saw blade 28 to move generally downward into the plane of the table 30. Rotation of rotary actuator 24 counterclockwise in turn, causes the saw blade 28 to rise generally upward out of a slot formed in table 30 as illustrated.

Figure 2:
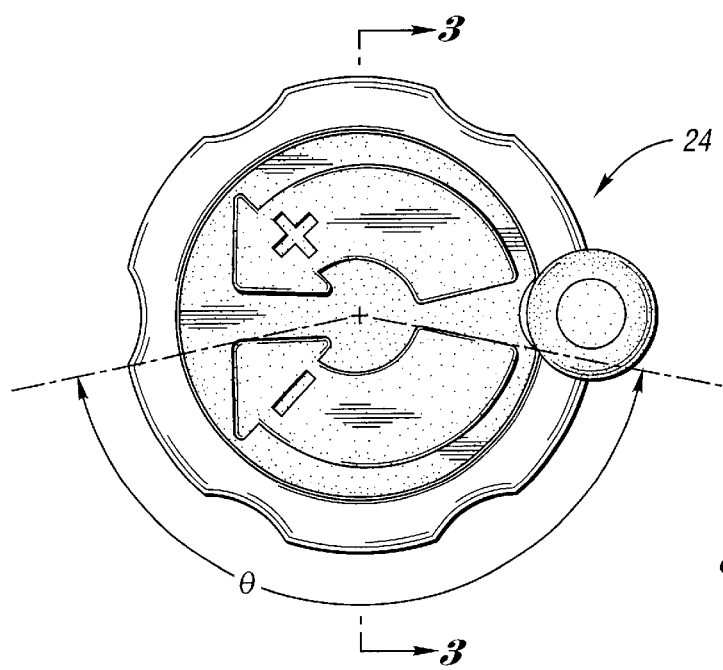
FIG. 2 is an axial end view of a rotary actuator equipped with a rotary direction indicator.
Figure 3:
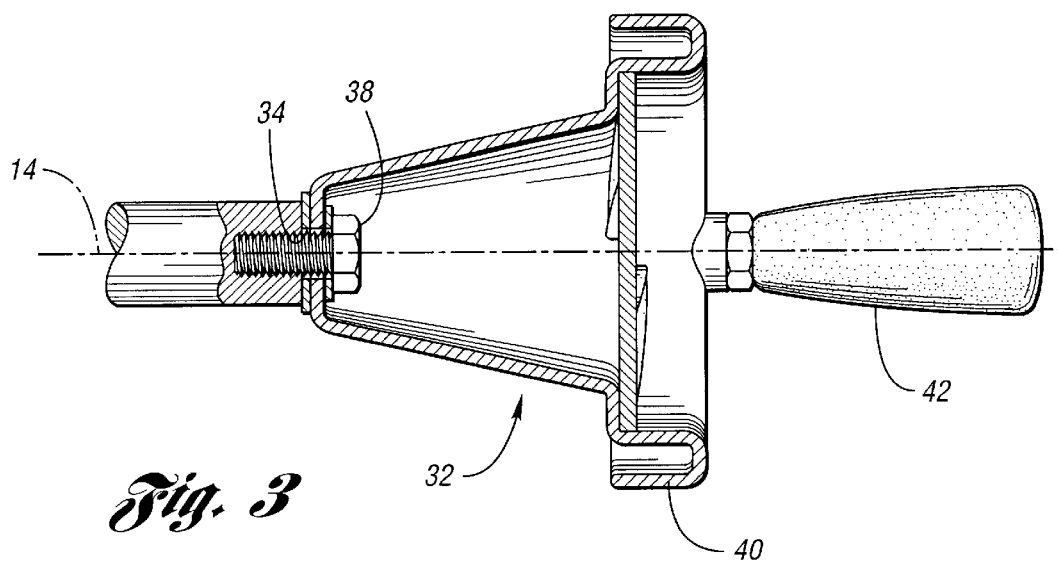
FIG. 3 is a cross section of the rotary actuator of FIG. 2 taken along section line 3—3.

The rotary actuator 24 is shown in better detail in FIGS. 2 and 3. The rotary actuator has a hub portion 32 which extends about central axis 14, the hub as a center portion provided with an aperture 34 to facilitate attachment of the rotary actuator to a shaft 36 by a bolt 38 or the like. The end of shaft 36 and corresponding face surface of the hub surrounding the aperture 34 will be serrated or provided with mating ribs and grooves to further prevent relative rotation of the hub 32 and shaft 36. Hub 32 is generally hat shaped in cross section as illustrated in FIG. 3. Rotary direction indicator 10 is a separate discreet element which is snapped into place once hub 32 has been affixed to shaft 36 as illustrated. Ideally, the outer periphery (the brim of the hat shaped hub) forms a hand wheel 40 providing a surface for the user to grasp which is spaced outboard from the central axis 14 to facilitate rotation of the rotary actuator 24. In the embodiment illustrated, elongate handle 42 is pivotally attached to the outer periphery of the hub to enable the user to quickly rotate the rotary actuator about central axis 14. Preferably, elongate handle 42 is pivotally mounted on an elongate bolt and is free to swivel about an elongate handle axis which is parallel to and spaced from the central axis 14.

In some applications, it is desired to rotate the handle in the clockwise direction to raise the associated member. Accordingly, a second embodiment, rotary actuator 50, is illustrated in FIG. 5. Rotary actuator 50 is identical to rotary actuator 24 except rotary direction indicator 52 has a clockwise arrow 54 which plunges into the surface of the body of the rotary direction indicator while clockwise arrow 56 rises out of the plane of the rotary direction indicator 52, just the opposite of the rotary direction indicator 10 shown in FIG. 1. The hub used in rotary actuator 50 is identical to the hub of the rotary actuator 24, the only difference being the rotary direction indicator installed in the hub.

A third embodiment, rotary direction indicator 60, is illustrated in FIGS. 6 and 7. Rotary direction indicator 60 is formed of a flat circular disk 62 which has imprinted thereon a counterclockwise arrow 64 and a clockwise arrow 66. Arrows 64 and 66 appear to rise and plunge into the surface of circular disk 62 where in fact, they are printed on a flat surface. The printing appears to resemble a photographic image of the rotary direction indicator of FIG. 1 taken slightly off axis with off axis lighting, thereby generating an apparently shadowed image consistent with a three-dimensional indicator arrow.

For best visual effect, it is desired that the clockwise and counterclockwise arrows in all of the embodiments be relatively large. Radially, the arrows each extend through an angle θ of 120° to 160° about the central axis. Preferably, the shaft portion of the indicator arrows are relatively wide. Most preferably, the shafts have a width equal to 25% to 60% of the radius of the circular disk forming the rotary direction indicator.

To further indicate the relative movement of the associated member with the rotation of the rotary direction indicator, the clockwise and counterclockwise arrows are further provided with a "+" and "−" indicator as illustrated. In FIG. 1, rotary direction indicator 10 has a counterclockwise arrow 18 provided with a plus indicia 44 while counterclockwise arrow 20 is provided with a minus indicia 46. In FIG. 5, rotary direction indicator 52 is provided with a minus "−" indicia 55 on counterclockwise arrow 54 and a plus "+" indicia 58 on clockwise arrow 56. Similarly, rotary direction indicator 62 is provided with a plus "+" indicia 68 on counterclockwise arrow 64 and a minus "−" indicia 70 on clockwise arrow 66. The rising and plunging arrows in combination with the plus and minus indicia make it readily apparent with minimal or no instruction, which direction the associated member will move in response to rotation of the rotary element associated with the rotary direction indicator.

In order to achieve the 3-D effect it is not necessary to tip the plane of the arrow very much relative to the plane of the flat surface of the rotary direction indicator. Preferably the top surface of the each of the three-dimensional indicating arrows will be generally planar and canted 1° to 15° relative to the plane of the disk body. Smaller diameter discs may require a larger cant angle to provide the desired visual effect. Preferably, the rotary direction indicator is made of injection molded plastic, however, the indicator could alternatively be stamped of metal or integrally formed into the hub of a rotary actuator.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A rotary direction indicator for use with a rotating element visible to a user which, when rotated causes an associated member to move linearly, the rotary direction indicator, comprising:

a body having a generally flat surface extending normal to a central axis; the body having formed therein a pair of three-dimensional indicating arrows, one, corresponding to a clockwise direction of rotation and the other corresponding to a counterclockwise direction of rotation of the body about the central axis, the three-dimensional arrows being spaced from and curving about the central axis each having a pointed arrowhead indicating a direction of rotation, one of the arrows rising out of the surface of the body and the other of the arrows plunging into the surface of the body, thereby providing the user with a visual indication of the correspondence between the direction of rotation of a rotating element and the linear movement of an associated member.

2. The rotary direction indicator of claim 1 wherein each of the three-dimensional indicating arrows lies in a plane which is inclined relative to the body and general flat surface.

3. The rotary direction indicator of claim 1 wherein one of the arrows is provided with a plus indicia and the other is provided with a minus indicia to further indicate the correspondence between the direction of rotation of the rotary element and the linear movement of the associated member.

4. The rotary direction indicator of claim 1 wherein the body is a generally circular disk.

5. The rotary direction indicator of claim 4 wherein each of the arrows extends between 120° and 160° about the central axis.

6. The rotary direction indicator of claim 4 wherein each arrow has a shaft portion and an enlarged pointed head portion with the shaft portion curving about the central axis on a generally constant radius.

7. The rotary direction indicator of claim 6 wherein each of the arrow shafts have a radially width 25% to 60% of the radius of the circular disk body.

8. The rotary direction indicator of claim 1 wherein the body is a generally circular disk which is a discreet member to be mounted to the rotating element.

9. A rotary actuator for installation upon a rotary shaft to be rotated by a user, the rotating shaft causing the associated member to move linearly, the rotary actuator comprising:

a hub adapted to be affixed to a shaft to be rotated, the hub having a front face surface visible to a user and an outboard handle portion radially disposed from the hub to be grasped by the user to rotate the actuator about a central axis aligned with the shaft; and a rotary direction indicator mounted to the actuator hub having a generally flat surface extending normal to the hub central axis, the flat surface of the rotary direction indicator having formed therein a pair of three-dimensional indicating arrows;

the three-dimensional arrows being spaced from and curving about the central axis each having a pointed arrowhead indicating a direction of rotation, one of the arrows rising out of the surface of the body and the other of the arrows plunging into the surface of the body, thereby providing the user with a visual indication of the correspondence between the direction of rotation of a rotary actuator and the linear movement of an associated member.

10. The rotary actuator of claim 9 wherein the handle portion is provided by the outer periphery of a wheel extending about the hub.

11. The rotary actuator of claim 9 wherein the handle portion is provided by a generally elongate handle which is radially spaced from and aligned relative to the central axis.

12. The rotary actuator of claim 11 wherein each of the arrow shafts have a radially width of 25% to 60% of the radius of the circular disk body.

13. The rotary actuator of claim 9 wherein the rotary direction indicator is provided with a plus indicia and the other is provided with a minus indicia to further indicate the correspondence between the direction of rotation of the rotary element and the linear movement of the associated member.

14. The rotary actuator of claim 9 wherein the body is a generally circular disk.

15. The rotary actuator of claim 9 wherein each of the arrows extends between 120° and 160° about the central axis.

16. The rotary actuator of claim 9 wherein each arrow has a shaft portion and an enlarged pointed head portion with the shaft portion curving about the central axis on a generally constant radius.

17. The rotary actuator of claim 9 wherein each of the three-dimensional indicating arrows lies in a plane which is inclined relative to the body and general flat surface.

18. The rotary actuator of claim 9 wherein the body is a generally circular disk which is a discreet member to be mounted to the rotating element.

19. The rotary direction indicator of claim 18 wherein the arrows are further provided with a plus indicia and a minus indicia to further provide a visual indication of the correspondence between the direction of rotation of the rotary element and the linear movement of the associated member.

20. A rotary direction indicator for use with a rotating element visible to a user which, when rotated causes an associated member to move linearly, the rotary direction indicator, comprising:

a body having a generally flat surface extending normal to a central axis; the body having formed therein a pair of indicating arrows, one, corresponding to a clockwise direction of rotation and the other corresponding to a counterclockwise direction of rotation of the body about the central axis;

the arrows being spaced from and curving about the central axis each having a pointed arrowhead indicating a direction of rotation, one of the arrows appearing to rise out of the surface of the body and the other of the arrows appearing to plunge into the surface of the body, thereby providing the user with a visual indication of the correspondence between the direction of rotation of a rotating element and the linear movement of an associated member.

21. The rotary direction indication of claim 20 wherein the body is substantially flat and the arrows are graphically imprinted thereon to provide a visual appearance of a three-dimensional arrow.

* * * * *